United States Patent

Ament et al.

[11] Patent Number: 5,655,641
[45] Date of Patent: Aug. 12, 1997

[54] CLUTCH DISC WITH BALANCING RIVETS

[75] Inventors: Norbert Ament, Eltingshausen; Dieter Bernhard, Schwebheim, both of Germany

[73] Assignee: Fichtel & Sachs AG, Schweinfurt, Germany

[21] Appl. No.: 573,040

[22] Filed: Dec. 15, 1995

[30] Foreign Application Priority Data

Dec. 15, 1994 [DE] Germany .............. 44 44 660.8

[51] Int. Cl.$^6$ ................................. F16D 13/64
[52] U.S. Cl. ............... 192/212; 29/436; 29/901; 192/207; 192/110 R
[58] Field of Search ............. 192/70.17, 201, 192/207, 212, 110 R; 29/436, 434, 901

[56] References Cited

U.S. PATENT DOCUMENTS

| | | | |
|---|---|---|---|
| 4,591,041 | 5/1986 | Valier | 192/107 R |
| 4,597,486 | 7/1986 | Kabayama | 192/70.14 X |
| 5,413,202 | 5/1995 | Maucher | 192/107 C |

FOREIGN PATENT DOCUMENTS

| | | | |
|---|---|---|---|
| 8286511 | 6/1983 | Australia . | |
| 3230022 | 2/1984 | Germany . | |
| 3434304 | 3/1986 | Germany | 192/110 R |
| 3608737 | 9/1987 | Germany . | |
| 2250069 | 5/1992 | United Kingdom | 192/110 R |

*Primary Examiner*—Rodney H. Bonck
*Attorney, Agent, or Firm*—Nils H. Ljungman and Associates

[57] ABSTRACT

The present invention generally relates to a clutch disc for a friction clutch, in which two identical cover plates are used, each of which has areas with different outside diameters, whereby the area with the larger diameter has the openings for fastening rivets for lining carriers and the openings for the location of balancing rivets, and the areas with the smaller diameter make it possible to have access with a tool for peening the rivet heads from the other side. The individual cover plates are also assembled to one another in mirror inversion.

20 Claims, 4 Drawing Sheets

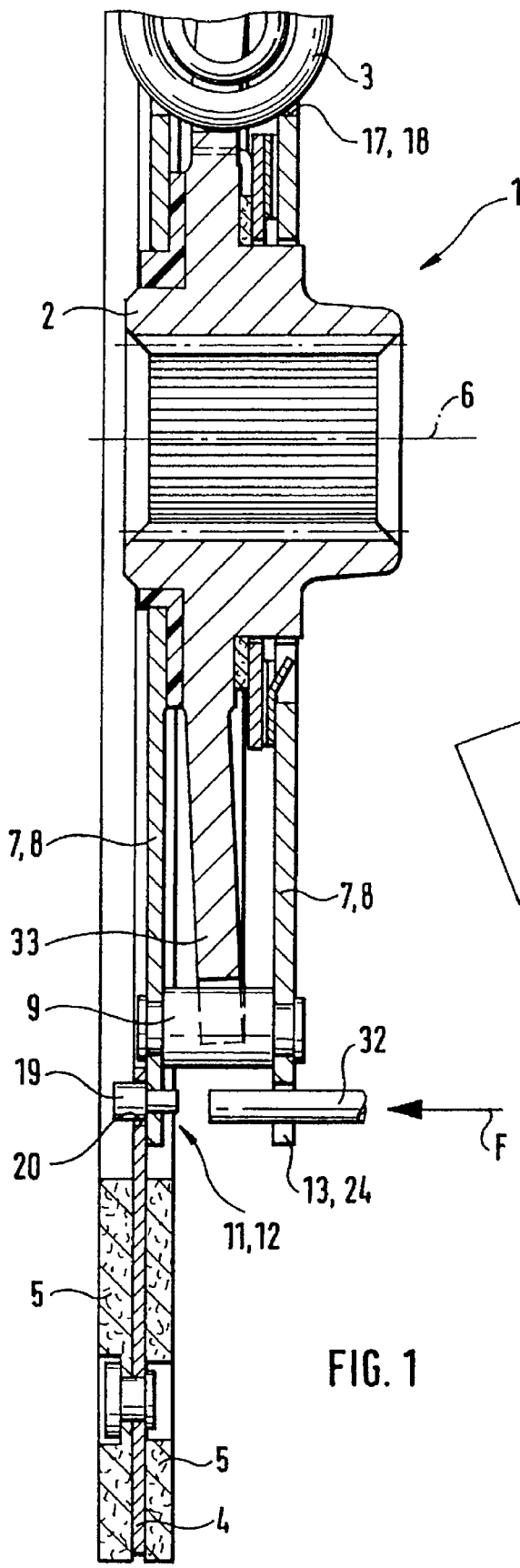
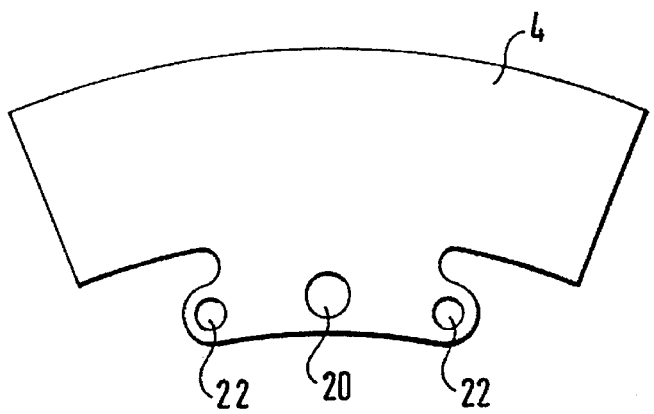
FIG. 2
FIG. 1

5,655,641

CLUTCH DISC WITH BALANCING RIVETS

BACKGROUND OF THE INVENTION

1. Field of the Invention

The present invention generally relates to a clutch disc for a friction clutch, in particular for the drive train of a motor vehicle, comprising a hub which is attached to a transmission shaft which defines an axis of rotation, two cover plates located on either side of the hub which have apertures to locate spring elements, and a lining carrier with friction rings, whereby the cover plates are provided in the vicinity of their outside diameter with openings into which balancing rivets can be inserted as necessary.

2. Background Information

German Unexamined Patent Application 32 30 022 discloses a clutch disc on which, in the radially outer area of the cover plate, there are balancing rivets which are attached from outside as blind rivets. Such blind rivets tend to be unreliable or unsafe in operation, since they are often exposed to vibrations and different temperatures and do not always stay correctly in place.

OBJECT OF THE INVENTION

The object of the present invention, on clutch discs of the type described hereinabove, is to significantly improve the fastening of the balancing rivets, so that they can be fastened in the conventional manner from both sides, with a closing head and a set head.

SUMMARY OF THE INVENTION

The present invention teaches that this object can be accomplished, in accordance with at least one preferred embodiment, by each cover plate being provided on its outer periphery with areas which have different diameters. Because, of the present invention, first areas with a larger diameter alternate with second areas with a smaller diameter, viewed in the circumferential direction, and the areas with the larger diameter on one hand have openings for the insertion of fastening rivets to fasten the lining carrier(s), and on the other hand have openings for the attachment of balancing rivets, and the two cover plates are assembled to one another so that, viewed in the axial direction, the areas with the larger diameter on the one cover plate correspond to areas with the smaller diameter on the other cover plate, so that at least a multiplicity of openings for the insertion of balancing rivets are accessible from both sides, it is possible, at the specified points, to insert balancing rivets with a set head and a closing head. As part of this process, the closing head can be plastically deformed from the opposite side using an appropriate tool.

As contemplated by an additional characteristic of the invention, it is advantageous that the differences between the two diameters are designed so that at least one-half of the core, or minor, diameter of the balancing rivets is accessible for the tool.

The present invention also teaches that the two cover plates can essentially be identical and can be installed at least in mirror inversion. In this manner it is possible to fabricate a clutch disc using only a few individual parts, which on one hand reduces costs and on the other hand simplifies inventory management.

Each cover plate thereby can have, with respect to the apertures for the spring elements, an axis of symmetry which runs through the axis of rotation, and the areas are non-symmetrically oriented, so that the areas of the two cover plates, when assembled, alternate along the circumference. Consequently, an area with a smaller diameter is essentially always opposite an area with a larger diameter on the other side, and essentially opposite an opening for a balancing rivet.

The present invention also teaches that the areas can have openings in pairs for fastening rivets to fasten the lining spring segments. These openings can be oriented essentially symmetrically with respect to the axis of symmetry, and starting from these rivet openings, the areas with the pairs of openings are provided in one direction of rotation with extensions, and these extensions have the openings for the balancing rivets. In such a design, there are apertures which are essentially uniformly distributed over the circumference at 90° intervals, and which are located symmetrically with respect to an axis of symmetry which runs through two apertures diametrically opposite one another, and the areas essentially located at a 90° interval from one another are also located offset with respect to the line of symmetry by 45°/135° in both directions of rotation, and the extensions each point in the same circumferential direction in an angular range approximately 0° to 45° and approximately 90° to 135° in the one direction of rotation, or approximately 45° to 90° and approximately 135° to 180° in the other direction of rotation. In this manner, it can be essentially guaranteed that when the cover plates are essentially identical and are installed in mirror inversion, viewed in the circumferential direction, the areas with the openings and the areas with the smaller diameter will alternate with one another, so that all the openings provided for balancing rivets can be reached from the opposite side.

Additional openings for balancing rivets are therefore provided if, in two diagonally opposite areas, circumferentially between the two openings for the fastening rivets corresponding to a lining carrier, there is an area which has a smaller diameter, and between the two openings, each lining carrier has an additional opening for the passage of a balancing rivet. Thus there are also four points distributed over the circumference for the location of balancing rivets.

In an additional construction, the present invention also teaches that in relation to the axis of symmetry through the apertures, there are essentially symmetrically paired openings for the fastening rivets of the lining carriers, at an angular interval of 22.5°–67.5°–112.5°–157.5°, and that all the areas are oriented essentially symmetrically around an additional axis of symmetry which is rotated by 45° in the clockwise direction with respect to the line of symmetry ($S_1$). With such a construction, it is possible to provide a total of eight lining carriers distributed over the circumference, and to get a large number of openings for the fastening of balancing rivets.

The present invention teaches that in this construction, starting from the axis of symmetry for the symmetrical layout of all the areas, the following areas alternate in the clockwise direction: A first area with the first opening for a fastening rivet for a lining carrier, a second area, a first area with the second opening for a fastening rivet of the lining carrier and an opening for a balancing rivet and two additional openings for the fastening rivets for a lining carrier with an opening located between them for a balancing rivet, a second area, a first area with two openings for fastening rivets for a lining carrier with openings located between them for a balancing rivet, a second area, a first area with a first opening for the fastening rivet of a lining carrier, a second area and a first area with the second opening for the fastening rivet of the same lining carrier. By means of such an arrangement it is possible, in connection with a total of sight lining carriers, to provide a total of ten openings for balancing rivets distributed around the circumference.

The construction contemplated by the present invention also makes it possible for the two cover plates to be essentially identical, and to be assembled in mirror inverted fashion, rotated by 180° in relation to one another. As a result of the additional possibility of the 180° rotation with respect to one another, two points diametrically opposite one another which cannot be provided with a balancing rivet can be modified by being rotated by 90° on the clutch disc. It is also possible, to a certain extent, to make an adjustment of the balancing capabilities to respond to changing circumstances.

When the word "invention" is used in this specification, the word "invention" includes "inventions", that is, the plural of "invention". By stating "invention", the Applicants do not in any way admit that the present application does not include more than one patentably and non-obviously distinct invention, end maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a friction clutch for a drive train of a motor vehicle: the friction clutch comprising: a rotary power input member; a housing; a clutch disc disposed within the housing, the clutch disc defining an axis of rotation and an axial direction parallel to the axis of rotation; pressure plate means disposed within the housing and movable in the axial direction, the pressure plate means for applying an axial force to the clutch disc along the axial direction for engaging the clutch disc with the rotary power input means; biasing means for biasing the pressure plate means in the axial direction to apply the axial force to the clutch disc; the clutch disc comprising: hub means, the hub means comprising: a hub portion for engaging shaft means of a transmission; and a hub disc disposed about the hub portion and extending radially from the hub portion, the hub disc having a first side and a second side; at least one cover plate disposed adjacent the hub disc, at least one cover plate being rotationally mounted on the hub portion for relative rotational movement with respect to the hub disc; and damping means for damping relative rotational movement between the hub disc and at least one cover plate; at least one cover plate comprising at least one opening therethrough at a position radially outward of the hub portion, at least one opening comprising a first edge portion and a second edge portion, the first and second edge portions being spaced apart from one another in a circumferential direction about the axis of rotation; the damping means being disposed in at least one opening, the damping means having a first end disposed adjacent the first edge portion of at least one opening and a second end disposed adjacent the second edge portion of at least one opening; at least one cover plate comprising holes therein for receiving fastening rivets; the fastening rivets being for fastening the friction lining means to at least one cover plate; at least one cover plate having a longitudinal axis, the longitudinal axis being perpendicular to the axis of rotation and being bisected by the axis of rotation; at least one cover plate comprising a first cover plate and a second cover plate, the first cover plate comprising an outer periphery and a central region, the outer periphery being disposed radially outwardly from the central region; the outer periphery of the first cover plate comprising at least one hole for receiving balancing rivets; at least one balancing rivet being disposed in at least one balancing rivet hole in the first cover plate; the second cover plate comprising an outer periphery and a central region, the outer periphery being disposed radially outwardly from the central region; the outer periphery of the second cover plate comprising areas of a first diameter D21 and areas of a second diameter D22; the areas of the first diameter D21 and the second diameter D22 of the second cover plate being disposed alternately in a circumferential direction about the outer periphery of the second cover plate; the diameter D22 being greater than the diameter D21 and the difference of the diameters forming at least one recess in the outer periphery of the second cover plate; and at least one recess of the second cover plate providing access for a tool for fastening at least one balancing rivet in at least one balancing rivet hole of the first cover plate from the side of the first cover plate disposed toward the second cover plate.

Another aspect of the present invention resides broadly in a method of making a friction clutch for a drive train of a motor vehicle: the friction clutch comprising: a rotary power input member; a housing; a clutch disc disposed within the housing, the clutch disc defining an axis of rotation and an axial direction parallel to the axis of rotation; pressure plate means disposed within the housing and movable in the axial direction, the pressure plate means for applying an axial force to the clutch disc along the axial direction for engaging the clutch disc with the rotary power input means; biasing means for biasing the pressure plate means in the axial direction to apply the axial force to the clutch disc; the clutch disc comprising: hub means, the hub means comprising: a hub portion for engaging shaft means of a transmission; and a hub disc disposed about the hub portion and extending radially from the hub portion, the hub disc having a first side and a second side; at least one cover plate disposed adjacent the hub disc, at least one cover plate being rotationally mounted on the hub portion for relative rotational movement with respect to the hub disc; and damping means for damping relative rotational movement between the hub disc and at least one cover plate; at least one cover plate comprising at least one opening therethrough at a position radially outward of the hub portion, the opening comprising a first edge portion and a second edge portion, the first and second edge portions being spaced apart from one another in a circumferential direction about the axis of rotation; the damping means being disposed in at least one opening, the damping means having a first end disposed adjacent the first edge portion of at least one opening and a second end disposed adjacent the second edge portion of at least one opening; at least one cover plate comprising holes therein for receiving fastening rivets; the fastening rivets being for fastening the friction lining means to at least one cover plate; at least one cover plate having a longitudinal axis, the longitudinal axis being perpendicular to the axis of rotation and being bisected by the axis of rotation; at least one cover plate comprising a first cover plate and a second cover plate, the first cover plate comprising an outer periphery and a central region, the outer periphery being disposed radially outwardly from the central region; the outer periphery of the first cover plate comprising at least one hole for receiving balancing rivets; at least one balancing rivet being disposed in at least one balancing rivet hole in the first cover plate; the second cover plate comprising an outer periphery and a central region, the outer periphery being disposed radially outwardly from the central region; the outer periphery of the second cover plate comprising areas of a first diameter D21 and areas of a second diameter D22; the areas of the first diameter D21 and the second diameter D22 of the second cover plate being disposed alternately in a circumferential direction about the outer periphery of the second cover plate; the diameter D22 being greater than the diameter D21 and the difference of the diameters forming at least one recess in the outer periphery of the second cover plate; and at least one recess of the second cover plate providing access for a tool for fastening at least one balancing rivet in at least one balancing rivet hole of the first cover plate from the side of the first cover plate disposed toward the second cover plate; the method comprising the steps of: providing a rotary power input member; providing a housing; providing a clutch disc and disposing the clutch disc within the housing, the clutch disc defining an axis of rotation and an axial direction parallel to the axis of rotation; providing pressure plate means and disposing the pressure plate means within the housing to be movable in the axial direction, the pressure plate having means for applying an axial force to the clutch disc along the axial direction for engaging the clutch disc with the rotary power input means; providing biasing means, the biasing means having means for biasing the pressure plate means in the axial direction to apply the axial force to the clutch disc; the step of providing a clutch disc comprises: providing a hub means, providing the hub means comprising: providing a hub portion, the hub portion having means for engaging shaft means of a transmission; and providing a hub disc and disposing the hub disc about the hub portion and configuring the hub disc to extend radially from the hub portion, and providing the hub disc with a first side and a second side; providing at least one cover plate and disposing the at least one cover plate adjacent the hub disc, mounting the at least one cover plate rotationally on the hub portion for relative rotational movement with respect to the hub disc; and providing damping means, the damping means having means for damping relative rotational movement between the hub disc and the at least one cover plate; configuring the at least one cover plate to comprise at least one opening therethrough at a position radially outward of the hub portion, forming the opening to comprise a first edge portion and a second edge portion, configuring the first and second edge portions to be spaced apart from one another in a circumferential direction about the axis of rotation; the step of providing damping means comprises disposing the damping means in the at least one opening, providing the damping means with a first end and disposing the first end adjacent the first edge portion of the at least one opening and providing the damping means with a second end and disposing the second end adjacent the second edge portion of the at least one opening; forming the at least one cover plate to comprise holes therein for receiving fastening rivets; providing fastening rivets and fastening the friction lining means to the at least one cover plate; configuring the at least one cover plate to have a longitudinal axis, the longitudinal axis being perpendicular to the axis of rotation and being bisected by the axis of rotation; the step of providing at least one cover plate comprises providing a first cover plate and a second cover plate, configuring the first cover plate to comprise an outer periphery and a central region, disposing outer periphery radially outwardly from the central region; providing the outer periphery of the first cover plate with at least one hole for receiving balancing rivets; disposing at least one balancing rivet in the at least one balancing rivet hole in the first cover plate; configuring the second cover plate to comprise an outer periphery and a central region, disposing the outer periphery radially outwardly from the central region; providing the outer periphery of the second cover plate with areas of a first diameter D21 and areas of a second diameter D22; disposing the areas of the first diameter D21 and the second diameter D22 of the second cover plate alternately in a circumferential direction about the outer periphery of the second cover plate; configuring the diameter D22 greater than the diameter D21 and providing the difference of the diameters for forming at least one recess in the outer periphery of the second cover plate; and configuring at least one recess of the second cover plate as a means for providing access for a tool for fastening, and fastening at least one balancing rivet in the at least one balancing rivet hole of the first cover plate from the side of the first cover plate disposed toward the second cover plate.

Another aspect of the present invention resides broadly in a clutch disc for a friction clutch, in particular for the drive train of a motor vehicle, comprising a hub which is placed on a transmission shaft which defines an axis of rotation, two cover plates located on either side of the hub with apertures for the location of spring elements, a lining carrier with friction rings, whereby the cover plates are provided in the vicinity of their outside diameter with openings into which balancing rivets can be inserted as necessary, characterized by the fact that each cover plate, viewed in the circumferential direction, in its outer periphery has areas which have different diameters such that first areas which have a larger diameter alternate with second areas which have a smaller diameter, and the areas which have the larger diameter on one hand have openings for fastening rivets to fasten the lining carrier or carriers, and on the other hand have openings for the attachment of balancing rivets, and the two cover plates are connected to one another so that, viewed in the axial direction, the areas which have the larger diameter of the one cover plate correspond to areas which have the smaller diameter of the other cover plate, so that at least a multiplicity of openings are accessible for the insertion of balancing rivets from both sides.

BRIEF DESCRIPTION OF THE DRAWINGS

The invention is illustrated in greater detail below with reference to two embodiments illustrated in the accompanying drawings.

FIG. 1 shows a partial longitudinal section A–B through a clutch disc;

FIG. 2 shows a plan view of a lining carrier;

DESCRIPTION OF THE PREFERRED EMBODIMENTS

Figure 3:
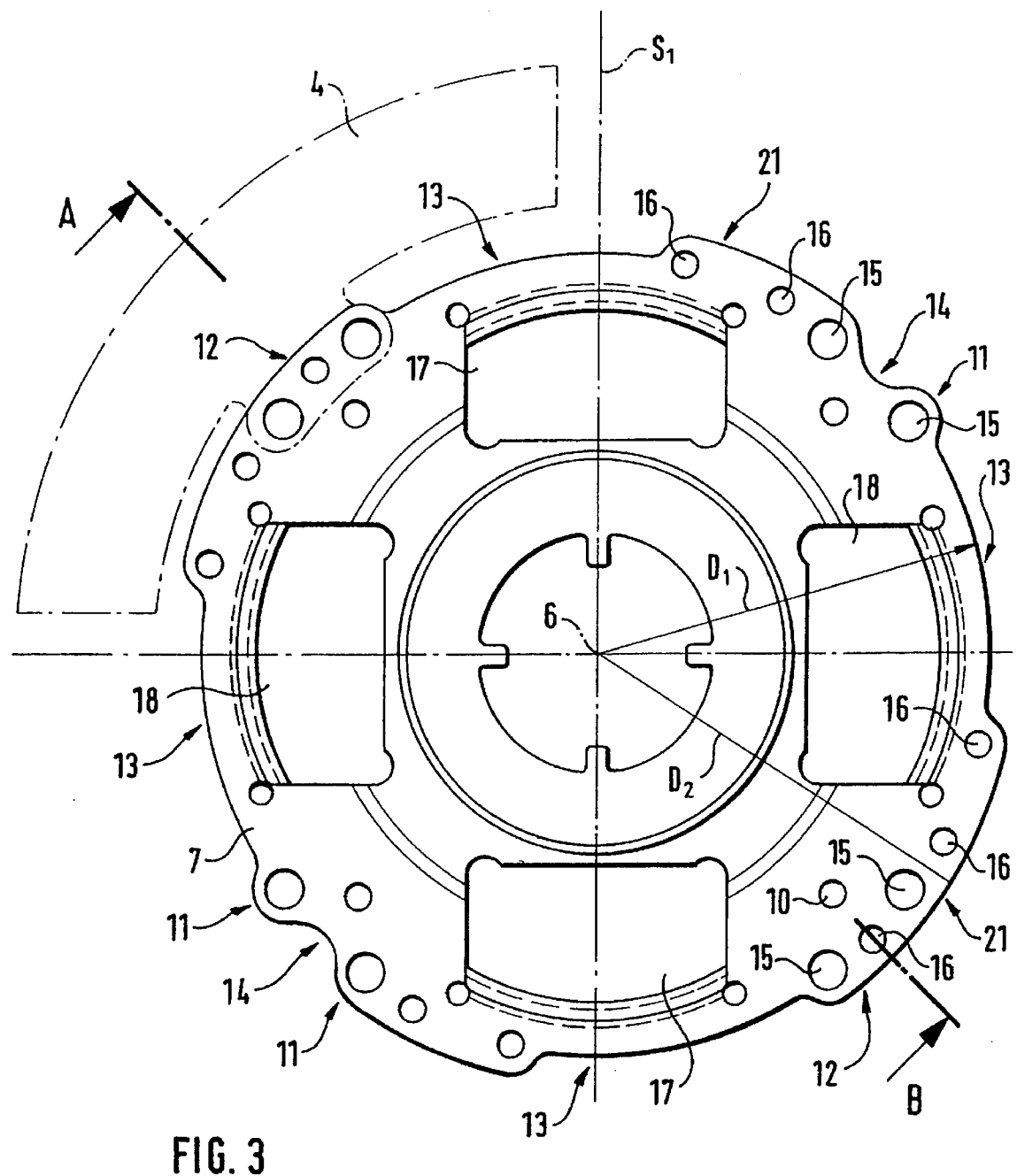
FIG. 3 shows a plan view of a cover plate with the section line A–B.

FIG. 1 shows a clutch disc 1, the basic construction of which is similar to that of known clutch discs. The clutch disc 1 has a hub 2 with internal gear teeth for attachment to a transmission shaft (not shown), with which it defines the axis of rotation 6. On either side of the hub disc 33 which extends radially outward from the hub 2, there are cover plates 7, 8, one of which is provided by means of lining carriers 4 with friction linings 5. The two cover plates 7, 8 are held at a distance from one another and are solidly connected to one another by means of spacer rivets 9 which are distributed over the circumference. In corresponding apertures 17 and 18 respectively, both in the cover plates 7, 8 and in the hub disc 33, there are spring elements 3 which, when torque is transmitted from the friction rings 5 to the transmission shaft, result in a torsional deflection. FIG. 1 also schematically indicates parts of friction devices which can be provided in all sorts of different forms.

In accordance with one embodiment, FIG. 1 shows a clutch disc 1. The basic construction of clutch disc 1 is similar to that of known clutch discs. The clutch disc 1 can have a hub 2 with internal gear teeth for attaching the hub 2 to a transmission shaft (not shown). The hub 2 can essentially define the axis of rotation 6. The hub disc 33 can extend radially outward from the hub 2, and on either side of the hub disc 33 there can preferably be cover plates 7, 8. One of the cover plates 7, 8 can be provided with a lining carrier 4. The friction rings, or linings 5 can preferably be affixed to the lining carrier 4. The two cover plates 7, 8 can preferably be held at a distance from one another and essentially solidly connected to one another by means of spacer rivets 9. The spacer rivets 9 can be distributed essentially over the outer radial area of the cover plates 7, 8. The cover plates 7, 8 and the hub disc 33 can preferably have corresponding apertures 17 and corresponding apertures 18. There can preferably be spring elements 3 disposed in the apertures 17 and the apertures 18. Preferably, torque can be transmitted from the friction rings 5 to the transmission shaft. This transmission of torque could essentially result in a torsional deflection of the spring elements 3. FIG. 1 also schematically indicates parts of friction devices which can be provided in all sorts of different forms.

FIG. 2 shows an individual lining carrier 4, which is explained in greater detail below with reference to FIG. 3 and/or FIG. 4.

In accordance with one embodiment, FIG. 2 is an illustration of a lining carrier 4 which can have openings 22 for fastening rivets. The lining carrier 4 can also have openings 20, which openings 20 could facilitate the insertion of a balancing rivet 19 into an aperture 16 of the cover plates 7, 8 (as shown respectively in FIG. 3 and FIG. 4).

FIG. 3 shows a cover plate 7 which can be attached in mirror inversion to a clutch disc 1 as shown in FIG. 1. This cover plate is substantially symmetrical about an axis of symmetry $S_1$ which runs through the axis of rotation with four apertures 17 and 18 distributed over the circumference for the spring elements 3. The two apertures 18 should preferably be the same size as one another, and the two apertures 17 should also be the same size as one another. The cover plate 7 is also preferably provided with areas which have two different outside diameters, whereby the larger outside diameter D2 occurs in different areas 11, 12, 31, and in these areas are located both the openings 15 for the fastening rivets for the individual lining carriers as well as openings 16 for the insertion of balancing rivets 19. The smaller diameter $D_1$ is provided between these areas 11, 12, 21 in the areas 13. In this case, there are a total of four areas 13 distributed uniformly around the circumference.

With respect to the axis of symmetry $S_1$, therefore, the external contour of the cover plate 7 is not realized in a symmetrical fashion. The areas 11, 12 with the larger diameter—like the apertures 17 and 18—are each located at 90° intervals, but the areas 11, 12 are offset by 45° and 135° respectively with respect to the axis of symmetry $S_1$. Starting from these areas 11, 12—counterclockwise—there are preferably extensions 21, which are located in an angular range of approximately 0° to 45° and 90° to 135° respectively. This is true for the right side in FIG. 3. On the left side, these areas 11 and 12 respectively, viewed in the other direction of rotation, are preferably offset by approximately 45° to 90° and approximately 135° to 180°. Each of these areas 11 and 12 respectively, viewed in both directions of rotation and symmetrical to the graduation 45° and 135° respectively, has paired openings 15 which can hold fastening rivets for the individual lining carriers 4.

Between each two such openings 15 there is an additional opening 16 to hold a balancing rivet 19. Thus two diametrically opposite areas 11 circumferentially between the two openings 15 are provided with an area 14 which has the smaller diameter $D_1$. Furthermore, the extensions 21 which are adjacent to the areas 11 and 12 and are oriented counterclockwise are each provided with two openings 16 which can be used to locate balancing rivets 19. When two identical cover plates 7 are used which are assembled in mirror inversion and are pivoted around the axis of symmetry $S_1$, it is therefore possible to realize openings 16 for balancing rivets 19 in a total of twenty locations distributed over the circumference. But it should be noted that those openings 16 which are located circumferentially between two openings 15 of a lining carrier 4 can essentially only be occupied if, as illustrated in FIG. 2, there is an additional opening 20 provided in the lining carrier 4 circumferentially between the two openings 22 for the fastening rivets, which makes it possible to insert a balancing rivet 19.

In accordance with one embodiment, FIG. 3 illustrates a cover plate 7 (which cover plate 7 can preferably be attached in mirror inversion to a clutch disc 1 as shown in FIG. 1). The cover plate 7 can essentially be symmetrical to an axis of symmetry $S_1$ which can preferably run through the axis of rotation. There can be, for the spring elements 3, two apertures 17 and two apertures 18. The apertures 17, 18 can be distributed peripherally within the circumference of the cover plate 7. The two apertures 17 can be disposed essentially opposite each other with respect to the axis of rotation. The two apertures 18 can also be disposed essentially opposite each other with respect to the axis of rotation. The two apertures 17 can be essentially bisected by the axis $S_1$. The two apertures 18 can be located perpendicularly to the axis $S_1$ in such a way that an aperture 18 can be located at approximately 0° and 180°, with respect to axis $S_1$, and an aperture 17 can be located at approximately 90° and 270°, with respect to axis $S_1$. The two apertures 18 should be essentially the same size as one another, and the two apertures 17 should also be essentially the same size as one another.

The cover plate 7 can also be provided with areas which can have essentially two different diameters. The larger, or outside diameter D2 can occur between the two areas 11, between the two areas 12, and between the two areas 21. The openings 15 for the fastening rivets for the lining carriers, and the openings 16 for insertion of balancing rivets 19 can be located in the areas 11, 12, and 21. The smaller diameter $D_1$ can be provided between these areas 11, 12, 21 in the areas 13. In this case, there can preferably be a total of four areas 13 distributed substantially uniformly about the circumference of the cover plate 7. With respect to the axis of symmetry $S_1$, therefore, the external contour of the cover plate 7 may not be realized in an essentially symmetrical fashion. The areas 11, 12 with the larger diameter, can each be located essentially at 90° intervals, like the apertures 17 and 18, but the areas 11, 12 can be essentially offset by 45° and 135° respectively with respect to the axis of symmetry $S_1$.

Starting from these areas 11, 12, counterclockwise, there can preferably be extensions 21, which can be located in an angular range of approximately 0° to 45° and 90° to 135° respectively. This can essentially be true for the right side in FIG. 3. On the left side, these areas 11 and 12 respectively, viewed in the other direction of rotation, can be offset by approximately 45° to 90° and approximately 135° to 180°. Each of these areas 11 and 12 respectively, viewed in both directions of rotation and symmetrical to the graduation 45° and 135° respectively, can have paired openings 15 which can hold fastening rivets for the individual lining carriers 4. Between each two such openings 15 there can be an additional opening 16 to hold a balancing rivet 19. Thus two essentially diametrically opposite areas 11 circumferentially between the two openings 15 can be provided with an area 14 which can have the smaller diameter $D_1$. Furthermore, the extensions 21 which can be essentially adjacent to the areas 11 and 12 and can be oriented counterclockwise can each be provided with two openings 16 which can be used to locate balancing rivets 19. Preferably, when two essentially identical cover plates 7 are used, assembled in mirror inversion, and pivoted around the axis of symmetry $S_1$, it is therefore essentially possible to realize openings 16 for balancing rivets 19 in a total of twenty locations distributed over the circumference of cover plate 7. But it should be noted that those openings 16 which can be located circumferentially between two openings 15 of a lining carrier 4 can essentially only be occupied if, as illustrated in FIG. 2, there can be an additional opening 20 provided in the lining carrier 4 circumferentially between the two openings 22 for the fastening rivets, which then can make it possible to insert a balancing rivet 19.

Figure 4:
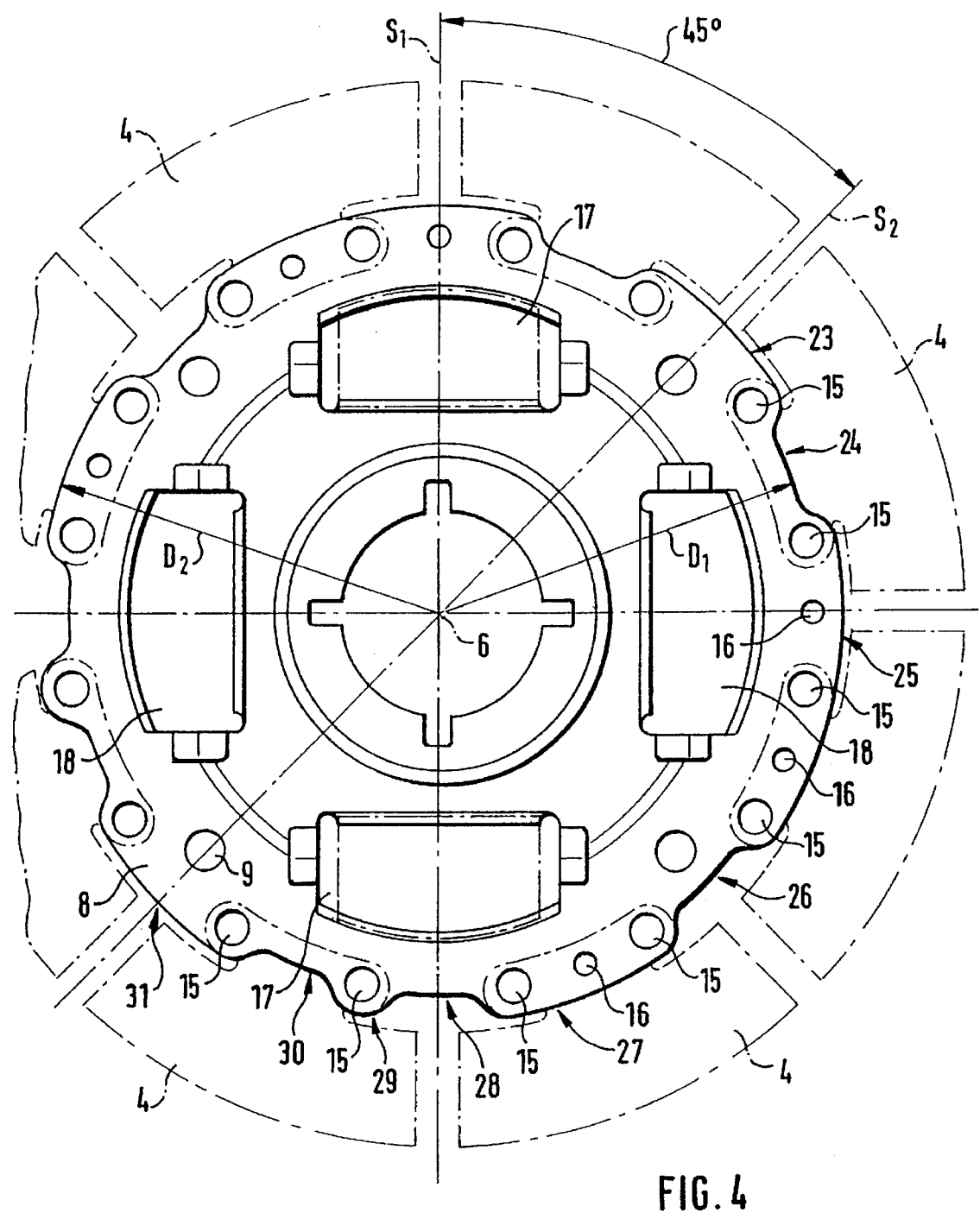
FIG. 4 shows a plan view of an additional cover plate.

An additional construction, illustrated in FIG. 4, makes it possible to locate a total of eight individual lining carriers 4 circumferentially on a cover plate 8, in which case the final effect is to achieve ten locations for the insertion of balancing rivets. The construction illustrated in FIG. 4 shows a cover plate 8 with a total of four apertures 17 and 18 respectively distributed on the circumference for the spring elements 3. Here, too, the apertures are symmetrically located with respect to an axis of symmetry which runs through the axis of rotation 6, such that the axis of symmetry runs through the two apertures 17, and the two apertures 18 are each offset by 90° from the axis of symmetry. There is also a second axis of symmetry $S_2$ which is offset by 45° with respect to the axis of symmetry $S_1$. The outer periphery of the cover plate 8 is realized so that it is symmetrical in relation to the axis of symmetry $S_2$. Here again, there are two different outside diameters, namely the larger diameter $D_2$ and the smaller diameter $D_1$. The areas 23, 25, 27, 29, 31 with the larger diameter $D_2$ distributed over the circumference contain both the openings 15 for the fastening rivets and the openings 16 for the balancing rivets 19. The areas 24, 26, 28, 30 located between them have a diameter $D_1$ which is reduced so that, as illustrated in FIG. 1, a tool 32 can be introduced to reach the closing head of the balancing rivet 19, thereby making it possible to peen the head of the rivet. As shown in FIG. 4, and starting from the axis of symmetry $S_2$, the following areas are located clockwise around the circumference of the cover plate 8:

The area 23 with the first opening for a lining carrier, the area 24 with the smaller diameter, the area 25 with the second opening 15 for the lining carrier 4, an opening 16, two openings 15 for the next lining carrier 4 with the opening 16 between them, an area 26 with a reduced diameter, an area 27 with two openings 15 and an opening 16 located between them, an area 28 with a reduced diameter, an area 29 with an opening 15 for a lining carrier, an area 30 with a reduced diameter and an area 31 with the second opening 15. All the areas described above are preferably repeated on the opposite side with reference to the axis of symmetry $S_2$. If such a cover plate 8 is pivoted around the axis of symmetry $S_1$ and installed in mirror inversion, it becomes possible to provide a balancing rivet 19 in almost all the openings 16. But in this case, excluded from that possibility are the two theoretically possible openings on the axis of symmetry $S_1$, whereby these openings in which balancing rivets cannot be inserted can also be rotated by 90°, if the two cover plates are assembled not only in mirror inversion, but if one of them is also rotated with respect to the other by an additional 180°.

In accordance with one embodiment, an additional construction illustrated in FIG. 4 can make it possible to locate eight individual lining carriers 4 circumferentially on a cover plate 8. In this case, the result can preferably be to achieve ten locations for the insertion of balancing rivets. The construction illustrated in FIG. 4 shows a cover plate 8 with four apertures 17 and 18 respectively distributed on the circumference for the spring elements 3. Here, too, the apertures can essentially be symmetrically located with respect to an axis of symmetry which can run through the axis of rotation 6, such that the axis of symmetry can essentially bisect the two apertures 17, and the two apertures 18 can each be essentially offset by 90° from the axis of symmetry. There can also be a second axis of symmetry $S_2$ which can essentially be offset by 45° with respect to the axis of symmetry $S_1$. The outer periphery of the cover plate 8 may be realized so that it can be substantially symmetrical in relation to the axis of symmetry $S_2$. Here again, there can be two different outside diameters, namely the larger diameter $D_2$ and the smaller diameter $D_1$. The areas 23, 25, 27, 29, and 31, with the larger diameter $D_2$ can be distributed over the circumference and may contain both the openings 15 for the fastening rivets and the openings 16 for the balancing rivets 19. The areas 24, 26, 28, and 30 can be located between the areas 23, 25, 27, 29, and 31, respectively, and can have a diameter $D_1$ which can be reduced so that, as illustrated in FIG. 1, a tool 32 can be introduced to reach the closing head of the balancing rivet 19. This, then, can make it possible to peen the head of the rivet. As shown in FIG. 4, and starting from the axis of symmetry $S_2$, the following areas can be located clockwise around the circumference of the cover plate 8:

The area 23 with the first opening for a lining carrier, the area 24 with the smaller diameter, the area 25 with the second opening 15 for the lining carrier 4, an opening 16, two openings 15 for the next lining carrier 4 with the opening 16 between them, an area 26 with a reduced diameter, an area 27 with two openings 15 and an opening 16 located between them, an area 28 with a reduced diameter, an area 29 with an opening 15 for a lining carrier, an area 30 with a reduced diameter and an area 31 with the second opening 15. All the areas described above can preferably be repeated on the opposite side with reference to the axis of symmetry $S_2$. If such a cover plate 8 can be pivoted around the axis of symmetry $S_1$ and installed essentially in mirror inversion, it can be possible to provide a balancing rivet 19 in almost all the openings 16. But in this case, essentially excluded from that possibility are the two theoretically possible openings on the axis of symmetry $S_1$. These openings in which balancing rivets essentially cannot be inserted can also be rotated by 90°, if the two cover plates can be assembled not only essentially in mirror inversion, but if one of them can also be substantially rotated with respect to the other by an additional 180°.

Figure 5:
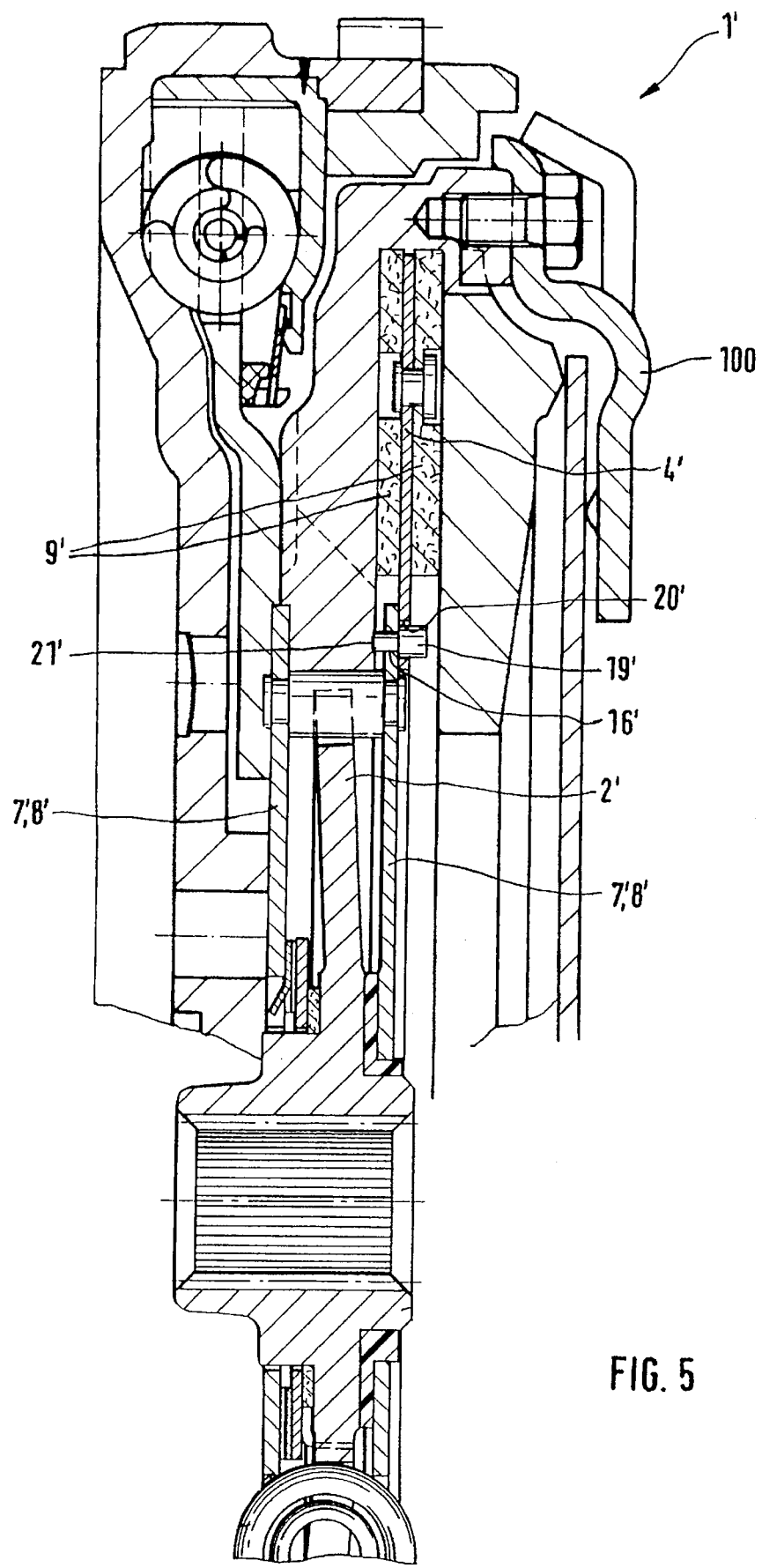
FIG. 5 illustrates a clutch assembly incorporating the present invention.

FIG. 5 shows the construction of a clutch assembly 1' in which at least one embodiment of the present invention may be employed. The clutch assembly 1' has a housing 100 which can define the exterior of the clutch assembly 1'. On either side of the hub disc 2' are cover plates 7', 8'. The friction linings 9' can be provided on lining carriers 4' of one of the cover plates 7', 8'. A balancing rivet 19' can be inserted through an additional hole 20' of the lining carrier 4' in order that the balancing rivet 19' can be located in the balancing rivet hole 16' of the cover plate 7', 8'. The rivet head 21' is shown in this construction as being peened. Other details illustrated in FIG. 5, and not otherwise discussed with direct reference to FIG. 5, can be derived from the discussion of FIGS. 1–4.

One feature of the invention resides broadly in the clutch disc for a friction clutch, in particular for the drive train of a motor vehicle, comprising a hub which is placed on a transmission shaft which defines an axis of rotation, two cover plates located on either side of the hub with apertures for the location of spring elements, a lining carrier with friction rings, whereby the cover plates are provided in the vicinity of their outside diameter with openings into which balancing rivets can be inserted as necessary, characterized by the fact that each cover plate 7, 8, viewed in the circumferential direction, in its outer periphery has areas 11–14, 23–31 which have different diameters $D_1$, $D_2$, such that first areas 11, 12; 23, 25, 27, 29, 31 which have a larger diameter $D_2$ alternate with second areas 13, 14; 24, 26, 28, 30 which have a smaller diameter $D_1$, and the areas 11, 12; 23, 25, 27, 29, 31 which have the larger diameter $D_2$ on one hand have openings 15 for fastening rivets to fasten the lining carrier or carriers 4, and on the other hand have openings 16 for the attachment of balancing rivets 19, and the two cover plates 7, 8 are connected to one another so that, viewed in the axial direction, the areas 11, 12; 23, 25, 27, 29, 31 which have the larger diameter $D_2$ of the one cover plate correspond to areas 13, 14; 24, 26, 28, 30 which have the smaller diameter $D_1$ of the other cover plate, so that at least a multiplicity of openings 16 are accessible for the insertion of balancing rivets 19 from both sides.

Another feature of the invention resides broadly in the clutch disc characterized by the fact that the differences between the two diameters $D_1$ and $D_2$ are designed so that at least one half of the core or minor diameter of the balancing rivets 19 is freely accessible.

Yet another feature of the invention resides broadly in the clutch disc characterized by the fact that the two cover plates 7, 8 are identical, and are installed at least in mirror-inverted or laterally reversed symmetry.

Still another feature of the invention resides broadly in the clutch disc characterized by the fact that each cover plate 7, 8, with respect to the apertures 17, 18 for the spring elements 3, has an axis of bisecting line $S_1$ which runs through the axis of rotation 6, and the areas 11–14 are not symmetrically oriented, so that when the cover plates are assembled, the areas 11–14 of the two cover plates alternate circumferentially.

A further feature of the invention resides broadly in the clutch disc characterized by the fact that the areas 11, 12 have openings 15 in pairs for fastening rivets used to fasten the lining spring segments 4, which openings are symmetrical to the axis of symmetry $S_1$, and starting from these openings, the areas 11, 12 are provided with extensions 21 in one direction of rotation, and these extensions have the openings 16 for the balancing rivets 19.

Another feature of the invention resides broadly in the clutch disc characterized by the fact that four apertures 17, 18 uniformly distributed over the circumference are provided at 90° intervals, and are oriented symmetrical to an axis of symmetry $S_1$ which runs through two apertures 17 which are diametrically opposite one another, and the areas 11, 12 also located at a 90° interval are offset by 45°/135° in both directions of rotation with respect to the axis of symmetry $S_1$, and have extensions 21, each in the same circumferential or peripheral direction, in an angular range of approximately 0° to 45° or approximately 90° to 135° respectively in the one direction of rotation, or approximately 45° to 90° or approximately 135° to 180° respectively in the other direction of rotation.

Yet another feature of the invention resides broadly in the clutch disc characterized by the fact that in two diagonally opposite areas 11, circumferentially between the openings 15 for the fastening rivets corresponding to a lining carrier 4, there is an area 14, and each lining carrier 4 has an additional opening 20 between the two openings 21 for the fastening rivets for the insertion of a balancing rivet 19.

Still another feature of the invention resides broadly in the clutch disc characterized by the fact that in relation to the axis of symmetry $S_1$ through the apertures, there are symmetrically paired openings 15 for the fastening rivets of the lining carriers 4, at an angular interval of 22.5°–67.5°–112.5°–157.5°, that all the areas 23–31 are oriented symmetrically around an additional axis of symmetry $S_2$ which is rotated by 45° in the clockwise direction with respect to the line of symmetry $S_1$.

A further feature of the invention resides broadly in the clutch disc characterized by the fact that—starting from the line of symmetry $S_2$—the following areas alternate in the clockwise direction: A first area 23 with a first opening 15 for a fastening rivet for a lining carrier 4, a second area 24, a first area 25 with the second opening 15 for a fastening rivet of the lining carrier 4, and an opening 16 for a balancing rivet 19 and two additional openings 15 for the fastening rivets for a lining carrier 4 with an opening 16 between them for a balancing rivet 19, a second area 26, a first area 27 with two openings 15 for fastening rivets for a lining carrier 4 with an opening 16 between them for a balancing rivet 19, a second area 28, a first area 29 with a first opening 15 for the fastening rivet of a lining carrier 4, a second area 30 and a first area 31 with the second opening 15 for a fastening rivet of the same lining carrier.

Another feature of the invention resides broadly in the clutch disc characterized by the fact that the two cover plates 8 are identical, and are installed in mirror inverted fashion and rotated by 180° in relation to one another.

Some examples of clutch assemblies and various components associated therewith which could possibly utilize the present invention may be disclosed in the following U.S. Pat. Nos.: 4,177,888 to Arrowsmith, entitled "Friction Clutch Plate with Two Concentric Hubs for Damping"; 5,431,269 to Ament and Raab, entitled, "Transmission for a Motor Vehicle with a Fraction Clutch Having A Clutch Disc with Torsionally Looked Friction Ring"; and 4,270,640 to Davies, entitled "Friction Clutch Driven Plates".

Some examples of rivets for balancing and various components associated therewith which may be utilized in accordance with the present invention, may be found in the following U.S. Pat. Nos.: 4,597,486 to Kabayama, entitled "Cluth Disc Assembly with Balancing Means" and 4,591,041 to Valier entitled, "Clutch Friction Disk Comprising Balancing Means".

Some examples of various tools and rivets which could possibly be utilized with the present invention may be disclosed in the following U.S. Pat. Nos.: 5,167,480 to Gilman and Zedalis, entitled "Rapidly Solidified High Temperature Aluminum Base Alloy Rivets"; 4,391,121 to Taruntaev, entitled "Orbital Tool Assembly for Forming Rivet Heads"; 4,425,067 to Krezak, entitled "Fatigue Resistant Rivet"; and 4,548,345 to Puritz and Lengen, entitled "Automatic Riveting Machine".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 44 660.8, filed on Dec. 15, 1994, having inventors Norbert Ament and Dieter Bernhard, and DE-OS P 44 44 660.8 and DE-PS P 44 44 660.8, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a drive train of a motor vehicle, said friction clutch comprising:

a housing;

a clutch disc disposed within said housing, said clutch disc defining an axis of rotation and an axial direction parallel to the axis of rotation;

said clutch disc comprising:

a friction lining carrier;

at least one friction lining disposed on said friction lining carrier;

a hub, said hub comprising:

a hub portion, said hub portion comprising means for engaging a transmission shaft; and a hub disc disposed about said hub portion and extending radially from said hub portion, said hub disc having a first side and a second side facing away from one another;

a first cover plate disposed adjacent said first side of said hub disc, said first cover plate having a first side and a second side facing away from one another, said first cover plate comprising at least one hole for receiving a balancing rivet;

a second cover plate disposed adjacent said second side of said hub disc, said second cover plate having a first side and a second side facing away from one another, said second cover plate comprising at least one hole for receiving a balancing rivet;

said friction lining carrier being disposed on one of said first cover plate and said second cover plate;

said first and second cover plates being operatively connected to said hub;

said first side of said first cover plate and said first side of said second cover plate facing toward one another;

said first cover plate comprising means for providing access for fastening a balancing rivet in said at least one balancing rivet hole of said second cover plate from said first side of said second cover plate, so that access is provided for the fastening of a balancing rivet from both said first side and said second side of said second cover plate; and said second cover plate comprising means for providing access for fastening a balancing rivet in said at least one balancing rivet hole of said first cover plate from said first side of said first cover plate, so that access is provided for the fastening of a balancing rivet from both said first side and said second side of said first cover plate.

2. The clutch disc according to claim 1 wherein:

said first cover plate comprises areas having a first diameter and areas having a second diameter;

said areas having the first diameter of said first cover plate and said areas having the second diameter of said first cover plate are disposed alternately about the axis of rotation and together form an outer periphery of said first cover plate;

the second diameter of said first cover plate is greater than the first diameter of said first cover plate to form at least one recess in said outer periphery of said first cover plate, said at least one recess in said first cover plate is disposed adjacent to the outer periphery of said areas having the first diameter of said first cover plate;

said first cover plate access means comprises said at least one recess in said outer periphery of said first cover plate;

said second cover plate comprises areas having a first diameter and areas having a second diameter;

said areas having the first diameter of said second cover plate and said areas having the second diameter of said second cover plate are disposed alternately about the axis of rotation and together form an outer periphery of said second cover plate;

the second diameter of said second cover plate is greater than the first diameter of said second cover plate to form at least one recess in said outer periphery of said second cover plate, said at least one recess in said second cover plate is disposed adjacent to the outer periphery of said areas having the first diameter of said second cover plate; and said second cover plate access means comprises said at least one recess in said outer periphery of said second cover plate.

3. The clutch disc according to claim 2, wherein:

said at least one balancing rivet hole in said first cover plate is disposed in said outer periphery of said first cover plate; and said at least one balancing rivet hole in said second cover plate is disposed in said outer periphery of said second cover plate.

4. The clutch disc according to claim 3, wherein:

said areas having said second diameter of said first cover plate comprise said at least one balancing rivet hole in said first cover plate;

said areas having said second diameter of said second cover plate comprise said at least one balancing rivet hole in said second cover plate;

said areas having said first diameter of said first cover plate and said areas having said second diameter of said second cover plate are substantially aligned with one another; and said areas having said second diameter of said first cover plate and said areas having said first diameter of said second cover plate are substantially aligned with one another.

5. The clutch disc according to claim 4, wherein:

said areas having the second diameter of said first cover plate and said second cover plate comprise holes therein for receiving fastening rivets; and said friction lining carrier is fastened to at least one of said first and second cover plates by means of:
  at least one of said fastening rivet holes of said one of said first and second cover plates; and
  at least one fastening rivet.

6. The clutch disc according to claim 5, wherein:

the difference between the first diameter and the second diameter of said first cover plate is sufficient to provide access to at least half of the core diameter of the shank of each of the balancing rivets disposed in said at least one balancing rivet hole of said first cover plate; and the difference between the first diameter and the second diameter of said second cover plate is sufficient to provide access to at least half of the core diameter of the shank of each of the balancing rivets disposed in said at least one balancing hole of said second cover plate.

7. The clutch disc according to claim 6, wherein:

said first and second cover plates each have a radial axis defined perpendicular to the axis of rotation;

the radial axis of said first cover plate is substantially parallel to the radial axis of said second cover plate;

the radial axis of said first cover plate divides said first side of said first cover plate into a first semicircular portion and a second semicircular portion;

each of said first and second semicircular portions of said first cover plate has a configuration;

the radial axis of said second cover plate divides said first side of said second cover plate into a first semicircular portion and a second semicircular portion;

each of said first and second semicircular portions of said second cover plate has a configuration;

said configurations of said semicircular portions of said first cover plate and said second cover plate are substantially alike; and said fastening rivet holes in said areas having the second diameter of said first and second cover plates are disposed in said outer peripheries of said areas having the second diameter.

8. The clutch disc according to claim 7, wherein:

each said area having the second diameter of said first cover plate and said second cover plate comprises an extension;

each said extension is disposed substantially adjacent one of said fastening rivet holes;

said at least one hole for receiving a balancing rivet in said first cover plate comprises a plurality of balancing rivet holes in said first cover plate;

at least one balancing rivet hole of said plurality of balancing rivet holes of said first cover plate is disposed in each of said extensions of said first cover plate;

said at least one hole for receiving a balancing rivet in said second cover plate comprises a plurality of balancing rivet holes in said second cover plate; and at least one balancing rivet hole of said plurality of balancing rivet holes of said second cover plate is disposed in each of said extensions of said second cover plate.

9. The clutch disc according to claim 8, wherein:

said clutch disc comprises means for damping relative rotational movement between said hub disc and said first and second cover plates;

said damping means comprises at least one opening in said first cover plate and at least one opening in said second cover plate, each of said at least one opening is disposed radially outward from said hub portion;

the radial axes of said cover plates are the beginning points of the division of said cover plates into degrees of arc, the radial axis having a 0° position and incrementation of degrees is calculated in a clockwise direction from each of the radial axes at 0°;

said at least one opening in said first cover plate comprises four openings spaced apart from one another about the axis of rotation at intervals of substantially 90°, beginning at substantially 0°;

said at least one opening in said second cover plate comprises four openings spaced apart from one another about the axis of rotation at intervals of substantially 90°, beginning at substantially 0°; and said fastening rivet holes of said first and second cover plates are disposed about the circumference of each said cover plate at intervals of substantially 90°, beginning at substantially 45°.

10. The clutch disc according to claim 9, wherein:

said extensions of said first and second cover plates are spaced apart about the circumference of said each said cover plate at intervals of substantially 90°, beginning at substantially 0°, and are disposed in ranges of substantially:

a) 0° to 45°;
b) 90° to 135°;
c) 180° to 225°; and
d) 270° to 315°.

11. The clutch disc according to claim 10, wherein:

said at least one recess of said first cover plate comprises two recesses of said first cover plate and said at least one recess of said second cover plate comprises two recesses of said second cover plate;

said recesses of said first cover plate are disposed substantially diametrically opposite one another and said recesses of said second cover plate are disposed substantially diametrically opposite one another; and beginning at substantially 0°, said recesses of said first cover plate and said second cover plate are disposed at substantially 45° and 225°.

12. The clutch disc according to claim 11, wherein:

said fastening rivet holes disposed at substantially 90° intervals comprise two fastening rivet holes disposed at each of the 90° intervals of said cover plates; and each of said diametrically opposite recesses of said first and second cover plates is disposed substantially between said two fastening rivet holes located at two of the four 90° intervals in said first cover plate and said second cover plate.

13. The clutch disc according to claim 12, wherein:

said first and second cover plates comprise one of said balancing rivet holes disposed between said two fastening rivet holes located at the other two of the four intervals of said first and second cover plates, which other two intervals do not comprise said recesses;

said at least one recess of said first and second cover plates comprises additional recesses; and in a clockwise direction, beginning at substantially 0° and ending at substantially 180°, each of said configurations comprises:
a) a first area comprising one of said extensions comprising two said balancing rivet holes;
b) a second area comprising said two fastening rivet holes having one said recess disposed therebetween;
c) a third area comprising one said additional recess;
d) a fourth area comprising another of said extensions comprising two said balancing rivet holes;
e) a fifth area comprising said two fastening rivet holes having one said balancing rivet hole disposed therebetween; and
f) a sixth area comprising another said additional recess.

14. The clutch disc according to claim 13, wherein:
said friction lining carrier comprises at least one friction lining carrier;
said at least one friction lining carrier comprises two holes for receiving fastening rivets for fastening said friction lining carrier to at least one of said first cover plate and said second cover plate;
said at least one friction lining carrier comprises means for providing access for fastening a balancing rivet in each said balancing rivet hole disposed between two said fastening rivet holes, so that access is provided for the fastening of a balancing rivet from both of said first and second sides of said cover plate;
said friction lining carrier access means comprises an access hole in said at least one friction lining carrier;
said friction lining carrier access hole is sufficient in size to allow a balancing rivet to pass therethrough and into one of said balancing rivet holes in one of said cover plates;
said friction lining carrier access hole is sufficient in size to allow a balancing rivet to be fastened in one of said balancing rivet holes in said cover plate thereto having said at least one friction lining carrier fastened; and
said access hole in said at least one friction lining carrier is disposed substantially between said two fastening rivet holes in said at least one friction lining carrier.

15. The clutch disc according to claim 6, wherein:
said first and second cover plates each have a radial axis defined perpendicular to the axis of rotation;
the radial axis of said first cover plate is substantially parallel to the radial axis of said second cover plate;
the radial axes of said cover plates are the beginning points of the division of said cover plates into degrees of arc, the radial axis having a 0° position and incrementation of degrees is calculated in a clockwise direction from the radial axes at 0°;
said at least one fastening rivet hole in said first and second cover plates comprises pairs of fastening rivet holes spaced apart from one another about the circumference of each of said first and second cover plates at intervals of substantially 45°, and beginning at substantially 0°, said pairs of fastening rivet holes are disposed substantially at:
a) 22.5°;
b) 67.5°;
c) 112.5°;
d) 157.5°;
e) 202.5°;
f) 247.5°;
g) 292.5°; and
h) 337.5°;

said clutch disc comprises means for damping relative rotational movement between said hub disc and said first and second cover plates;
each of said first cover plate and said second cover plate comprise at least one opening at a position radially outward of said hub portion;
said damping means comprises said at least one opening in said first cover plate and said at least one opening in said second cover plate;
said at least one opening in said first cover plate comprises four openings spaced apart from one another about the axis of rotation at intervals of substantially 90°, beginning at substantially 0°; and
said at least one opening in said second cover plate comprises four openings spaced apart from one another about the axis of rotation at intervals of substantially 90°, beginning at substantially 0°.

16. The clutch disc according to claim 15, wherein:
each of said first and second cover plates has an axis of symmetry, and beginning at substantially 0°, each axis of symmetry is located at substantially 45°;
the axis of symmetry of said first cover plate divides said first side of said first cover plate into a first semicircular portion and a second semicircular portion;
said outer periphery of said first semicircular portion of said first cover plate has a configuration;
said outer periphery of said second semicircular portion of said first cover plate has a configuration;
said configurations of said outer peripheries of said first and second semicircular portions of said first cover plate are substantially mirror images of one another;
the axis of symmetry of said second cover plate divides said first side of said second cover plate into a first semicircular portion and a second semicircular portion;
said outer periphery of said first semicircular portion of said second cover plate has a configuration;
said outer periphery of said second semicircular portion of said second cover plate has a configuration; and
said configurations of said outer peripheries of said first and second semicircular portions of said second cover plate are substantially mirror images of one another.

17. The clutch disc according to claim 16, wherein:
said at least one balancing rivet hole comprises a plurality of balancing rivet holes;
said at least one recess comprises a plurality of recesses; and
in a clockwise direction, beginning substantially at 45° and ending at substantially 225°, said first configurations comprise:
a) a first area comprising one said fastening rivet hole for a fastening rivet for a first lining carrier;
b) a second area comprising one said recess;
c) a third area comprising:
a fastening rivet hole for a second fastening rivet for a first lining carrier;
a balancing rivet hole; and
two said fastening rivet holes for fastening rivets for a second lining carrier, and a balancing rivet hole disposed between said two fastening rivet holes for a second said lining carrier;
d) a fourth area comprising another said recess;
e) a fifth area comprising two said fastening rivet holes for a third lining carrier, and a balancing rivet hole disposed between said two fastening rivet holes for a third lining carrier;

f) a sixth area comprising another said recess;

g) a seventh area comprising one said fastening hole for a fastening rivet for a fourth lining carrier;

h) an eighth area comprising another said recess; and i) a ninth area comprising a second fastening rivet hole for a fastening rivet for fastening said fourth lining carrier.

18. The clutch disc according to claim 17, wherein said first cover plate is oriented with respect to said second cover plate so that the radial axes of said first and second cover plates are disposed to be antiparallel with respect to one another upon assembly of said clutch disc.

19. A clutch disc for a friction clutch for a drive train of a motor vehicle, said clutch disc defining an axis of rotation and an axial direction parallel to the axis of rotation, said clutch disc comprising:

friction lining carrier;

at least one friction lining disposed on said friction lining carrier;

a hub, said hub comprising:
   a hub portion, said hub portion comprising means for engaging a transmission shaft; and
   a hub disc disposed about said hub portion and extending radially from said hub portion, said hub disc having a first side and a second side facing away from one another;

a first cover plate disposed adjacent said first side of said hub disc, and comprising means for receiving a balancing rivet; and a second cover plate disposed adjacent said second side of said hub disc, and comprising means for receiving a balancing rivet;

said friction lining carrier being disposed on one of said first cover plate and said second cover plate;

said first and second cover plates being operatively connected to said hub;

said first cover plate comprising means for providing access for fastening a balancing rivet to said second cover plate; and said second cover plate comprising means for providing access for fastening a balancing rivet to said first cover plate.

20. A method of making a friction clutch for a drive train of a motor vehicle, said friction clutch comprising: a housing; a clutch disc disposed within said housing, said clutch disc defining an axis of rotation and an axial direction parallel to the axis of rotation; said clutch disc comprising: a friction lining carrier; at least one friction lining disposed on said friction lining carrier; a hub, said hub comprising: a hub portion, said hub portion comprising means for engaging a transmission shaft; and a hub disc disposed about said hub portion and extending radially from said hub portion, said hub disc having a first side and a second side facing away from one another; a first cover plate disposed adjacent said first side of said hub disc, said first cover plate having a first side and a second side facing away from one another, said first cover plate comprising at least one hole for receiving a balancing rivet; a second cover plate disposed adjacent said second side of said hub disc, said second cover plate having a first side and a second side facing away from one another, said friction lining carrier being disposed on one of said first cover plate and said second cover plate; said first and second cover plates being operatively connected to said hub; said second cover plate comprising at least one hole for receiving a balancing rivet; said first side of said first cover plate and said first side of said second cover plate facing toward one another; said first cover plate comprising means for providing access for fastening a balancing rivet in said at least one balancing rivet hole of said second cover plate from said first side of said second cover plate, so that access is provided for the fastening of a balancing rivet from both said first side and said second side of said second cover plate; and said second cover plate comprising means for providing access for fastening a balancing rivet in said at least one balancing rivet hole of said first cover plate from both said first side and said second side of said first cover plate, so that access is provided for the fastening of a balancing rivet from said first side of said first cover plate; said method comprising the steps of:

providing a housing;

providing a clutch disc and disposing the clutch disc within the housing, the clutch disc defining an axis of rotation and an axial direction parallel to the axis of rotation;

said step of providing a clutch disc comprising the steps of:

providing a friction lining carrier;

providing at least one friction lining and disposing the friction lining on the friction lining carrier;

providing a hub, said step of providing a hub comprising the steps of:
   providing a hub portion, said step of providing a hub portion comprising providing the hub portion with means for engaging a transmission shaft; and
   providing a hub disc and disposing the hub disc about the hub portion, said step of providing and disposing the hub disc comprises:
      configuring the hub disc to extend radially from the hub portion; and
      configuring the hub disc to have a first side and a second side facing away from one another;

providing a first cover plate and disposing the first cover plate adjacent the first side of the hub disc, said step of providing the first cover plate comprising:
   configuring the first cover plate to have a first side and a second side facing away from one another; and
   forming the first cover plate to comprise at least one hole for receiving a balancing rivet;

providing a second cover plate and disposing the second cover plate adjacent the second side of the hub disc, said step of providing the second cover plate comprising:
   configuring the second cover plate to have a first side and a second side facing away from one another; and
   forming the second cover plate to comprise at least one hole for receiving a balancing rivet;

disposing the first side of the first cover plate and the first side of the second cover plate to face toward one another;

configuring the first cover plate to comprise means for providing access for fastening a balancing rivet in the at least one balancing rivet hole of the second cover plate from the first side of the second cover plate, so that access is provided for the fastening of a balancing rivet from both the first side and the second side of the second cover plate; and configuring the second cover plate to comprise means for providing access for fastening a balancing rivet in the at least one balancing rivet hole of the first cover plate from the first side of the first cover plate, so that access is provided for the fastening of a balancing rivet from both the first side and the second side of the first cover plate.

* * * * *

UNITED STATES PATENT AND TRADEMARK OFFICE
CERTIFICATE OF CORRECTION

PATENT NO. : 5,655,641
DATED : August 12, 1997
INVENTOR(S) : Norbert AMENT and Dieter BERNHARD It is certified that error appears in the above-identified patent and that said Letters Patent is hereby corrected as shown below:

In column 3, line 1, before 'lining', delete "sight" and insert --eight--.

In column 3, line 19, after 'invention,', delete "end" and insert --and--.

In column 12, line 15, after 'openings', delete "21" and insert --22--.

In column 12, line 53, after 'with a', delete "Fraction" and insert --Friction--.

Signed and Sealed this

Twenty-fifth Day of November, 1997

Attest:

BRUCE LEHMAN

*Attesting Officer*       *Commissioner of Patents and Trademarks*